US010619599B1

(12) United States Patent
Walser et al.

(10) Patent No.: US 10,619,599 B1
(45) Date of Patent: Apr. 14, 2020

(54) TWO-PHASE LPG FUEL SUPPLY

(71) Applicant: Enovation Controls, LLC, San Antonio, TX (US)

(72) Inventors: Michael Walser, Comfort, TX (US); Kennon Guglielmo, San Antonio, TX (US)

(73) Assignee: EControls, LLC, San Antonio, TX (US)

( * ) Notice: Subject to any disclaimer, the term of this patent is extended or adjusted under 35 U.S.C. 154(b) by 861 days.

(21) Appl. No.: 14/724,778

(22) Filed: May 28, 2015

Related U.S. Application Data

(60) Provisional application No. 62/003,736, filed on May 28, 2014.

(51) Int. Cl.
*F02M 25/08* (2006.01)
*F02D 19/02* (2006.01)
(Continued)

(52) U.S. Cl.
CPC ....... *F02M 21/0233* (2013.01); *F02D 19/027* (2013.01); *F02D 19/0665* (2013.01);
(Continued)

(58) Field of Classification Search
CPC ............. F02D 41/0025; F02D 41/0027; F02D 41/003; F02D 41/004; F02D 41/38;
(Continued)

(56) References Cited

U.S. PATENT DOCUMENTS 4,385,615 A * 5/1983 Keane ................. F02D 19/0647
123/514
5,441,026 A * 8/1995 Akimoto ............... F02D 33/006
123/198 D
(Continued)

FOREIGN PATENT DOCUMENTS

JP 2003239785 A * 8/2003 ......... F02M 21/0212
JP 2007332879 A * 12/2007

OTHER PUBLICATIONS

English Machine Translation Provided by ESPACENET of JP2003239785.*
(Continued)

*Primary Examiner* — Jacob M Amick
*Assistant Examiner* — Michael A Kessler
(74) *Attorney, Agent, or Firm* — William H. Quirk; Jesse Frizzell; Rosenthal Pauerstein Sandoloski Agather LLP (57) ABSTRACT

A fuel supply system for propane and other LPG fuels is disclosed for internal combustion engines such as spark-ignited direct-injection (SIDI) engines, with features that help manage both liquid and gaseous phases of the LPG fuel. Preferably adapted for use with replaceable fuel canisters, the ECM-managed system has a hot-soak vapor purge system as well as various sensors and valves to prevent excessive boil-off and to otherwise manage the heat and the related liquid-vapor balance of the fuel supply. Although various control strategies are contemplated in different respects, the system preferably uses an intermediate pressure vessel in which the amount of gravity-fed liquid LPG is monitored using a float sensor or the equivalent, and the system is programmed to intervene through valve controls to vent excessively hot LPG vapors from the pressure vessel directly to the engine's intake manifold as a way of managing the heat and liquid-vapor balance in the pressure vessel, accommodating the vented flow by blending the (Continued)

vented fuel vapors with fuel from liquid rail injectors to still produce the desired overall mass flow rate of the fuel to produce the appropriate power levels from the engine.

7 Claims, 3 Drawing Sheets (51) Int. Cl.
*F02D 19/08* (2006.01)
*F02M 21/02* (2006.01)
*F02D 41/30* (2006.01)
*F02D 41/00* (2006.01)
*F02D 19/06* (2006.01)

(52) U.S. Cl.
CPC ......... *F02D 19/081* (2013.01); *F02D 41/003* (2013.01); *F02D 41/3082* (2013.01); *F02M 21/0212* (2013.01); *F02M 21/0221* (2013.01); *F02M 21/0239* (2013.01); *F02M 21/0245* (2013.01); *F02M 21/0248* (2013.01); *F02M 25/0836* (2013.01)

(58) Field of Classification Search
CPC .. F02D 41/3836; F02D 41/3863; F02D 19/02; F02D 19/021; F02D 19/022; F02D 19/027; F02D 19/028; F02D 19/0628; F02D 19/0642; F02D 19/0647; F02D 19/0665; F02D 19/0694; F02D 19/081; F02D 2200/0602; F02D 2200/0606; F02M 21/0212; F02M 21/0218; F02M 21/0221; F02M 21/0224; F02M 21/023; F02M 21/0239; F02M 21/0242; F02M 21/0245; F02M 21/08; F02M 25/0836; F02M 5/08; F02M 5/085; F02M 5/10; F02M 37/10; F02M 37/106; F02M 37/20; F02M 37/0023; F02M 37/0052; F02M 37/0088; Y02T 10/36; Y02T 10/32; F17C 1/00

USPC ................ 123/304, 525, 575, 431, 514, 516
See application file for complete search history.

(56) References Cited

U.S. PATENT DOCUMENTS

| | | | | |
|---|---|---|---|---|
| 7,188,610 B2* | 3/2007 | Crary | ................... | F02M 33/08 123/457 |
| 7,213,574 B2* | 5/2007 | Nishimura | ............ | F02D 41/022 123/431 |
| 7,610,899 B2* | 11/2009 | Nakamura | .............. | F02D 37/02 123/431 |
| 7,703,435 B2* | 4/2010 | Surnilla | .............. | F02D 19/0628 123/27 GE |
| 7,802,562 B2* | 9/2010 | Lippa | .................. | F02D 19/0684 123/1 A |
| 8,166,956 B2* | 5/2012 | Ulrey | .................. | F02D 19/0694 123/525 |
| 9,222,433 B2* | 12/2015 | Falkowski | .............. | F02D 41/32 |
| 9,255,531 B2* | 2/2016 | Zhang | .................... | F02D 19/06 |
| 10,450,989 B2* | 10/2019 | Matsunaga | ......... | F02D 41/3845 |
| 2002/0144730 A1* | 10/2002 | Brock | .............. | B60K 15/03504 137/202 |
| 2008/0245346 A1* | 10/2008 | Onishi | .............. | F02M 37/0058 123/514 |
| 2012/0291758 A1* | 11/2012 | Saito | .................... | F02D 19/024 123/515 |
| 2015/0322905 A1* | 11/2015 | Dearth | .................. | F02M 33/00 123/445 |

OTHER PUBLICATIONS

Human English Translation of JP 2007332879 A (Year: 2007).*
Partial Human Translation of JP2003239785 (Year: 2019).*

* cited by examiner

TWO-PHASE LPG FUEL SUPPLY

CLAIM OF PRIORITY TO PRIOR APPLICATION

The present application claims the benefit of prior filed U.S. Provisional Application, Ser. No. 62/003,736, filed May 28, 2014. By this reference, the full disclosure, including the drawings and any claims, of U.S. Provisional Application, Ser. No. 62/003,736, is incorporated herein as though now set forth in its entirety.

NONPUBLICATION REQUESTED

This application is a non-provisional application under 37 CFR 1.53(b) and is submitted with an accompanying nonpublication request in accordance with 35 U.S.C. § 122(b). Accordingly, the subject matter of this application is to be maintained in secrecy until and unless Applicant either rescinds as much or allows a patent to issue based on this application.

BACKGROUND OF THE INVENTION

1. Field of the Invention

The present invention relates to propane and other liquefied petroleum gas (LPG) fuel supplies for spark-ignited direct-injection (SIDI) engines and engine-powered machines. More particularly, the invention relates to such LPG fuel supplies, engines and machines that receive LPG fuel by gravity-feed or the like from a replaceable storage canister into an intermediate pressure vessel and then pump at least the liquid phase of the LPG fuel through higher pressure rails for controlled delivery to the associated SIDI engine.

2. Description of Related Art

LPG fuels have long been known to offer great promise as an alternative fuel. The designation "LPG fuel" refers to a wide variety of liquefied petroleum gas fuels. Propane and butane are classic examples that have long been a staple fuel alternative for vehicular and other internal combustion engines, and various blends have also become popular, such as what is commonly referred to as "Autogas." Although LPG energy density per volume tends to be less than gasoline, LPG fuels are particularly attractive because they burn relatively cleanly, with less soot and lower sulfur emissions, as compared to gasoline, heating oil, and many other liquid fuels. While LPG readily vaporizes in standard atmospheric conditions, it also poses fewer ground or water pollution hazards.

For maintaining its liquid phase when stored, LPG fuel is typically stored in nonpowered, pressurized canisters, typically holding pressures around 150 psi or, more generally, in the 50 psi to 250 psi range. Such storage canisters tend to be portable and tend to have standardized sizes and fittings for various applications, and the corresponding LPG fuel is commonly replenished by replacing a relatively empty canister with a substantially full one. While the standard canisters are non-powered, corresponding fuel supply systems typically receive the LPG from the canister through gravity feed (aka liquid draw) or the like.

Despite the challenges, LPG fuels have long been used in internal combustion engines. Such engines are used in a wide variety of applications ranging from automobiles and other larger scale applications and devices, as well as small applications along the lines of lawnmowers and leaf blowers, etc. Although some of such applications involve custom-designed fuel tanks, many are served by non-powered portable tanks, which are commonly available in standard sizes.

Typically, the LPG canister or tank is oriented in a way so as to ensure that only liquid phase fuel is withdrawn from the LPG tank during operation of the fuel supply system and its associated internal combustion engine. It is not uncommon to create a reasonable separation between the LPG tank and the engine so as to reduce heat transfer on the LPG tank.

During operation of related systems, the liquid propane flows through various conduits to either a vaporizer or a vaporizer-regulator structure. The vaporizer or vaporizer-regulator induces conversion of the liquid propane into gaseous propane. A common occurrence in the related inventions arose from the latent heat of vaporization of the liquid propane—during conversion—which would cause a significant temperature drop in the vaporizer or vaporizer-regulator, and in many applications, would freeze the liquid propane and, thus, stop the flow of propane to the engine. This occurrence presents a serious problem, unless a heater of some sort was introduced proximately close to the vaporizer or vaporizer-regulator.

Additionally, many of the related art LPG-fueled internal combustion engine powered devices use butane as the LPG or a combination of butane and propane. Use of butane as the LPG is more common in Asia, while in the United States and in Europe, propane LPG tanks are rather common. The attributes of propane, as compared to butane, make propane LPG tanks more appealing in internal combustion engine applications. For example, for an equivalent amount of LPG, a butane-fueled device operates for about one-sixth (or less) the time that a propane-fueled device operates. Also, the butane tanks typically only use gas-phase butane for withdrawal from the bottle and ensure that only gas is withdrawn and, thus, require a preferred orientation with respect to gravity. Since liquid-phase butane becomes gas-phase butane at about 31 degrees F., there is little cooling effect due to evaporation. Likewise, freezing in the LPG tank or in the system is not likely when used in a small internal combustion engine. At ambient pressures, liquid-phase propane converts to gaseous propane at about minus 44 degrees F.

Also, prior devices have attempted to fuel vehicles and other internal combustion engines with bi-fuel systems. Such devices claim greater user flexibility and environmental benefits. These devices are more frequently used in engines for sophisticated uses such as automobiles, and the engine is adapted to run alternatively on a liquid fuel, such as petrol, and a fuel such as LPG. The two fuels are generally stored in respective tanks. In such multi-fuel solutions, each fuel system has its own set of fuel injectors so that for each cylinder of the engine, two fuel injectors are arranged to communicate with the respective fuel tanks. A number of issues typically arise. The separate tanks require greater control demands and expense, etc. Not surprisingly, such applications are less practical outside the realm of cars and trucks.

Lastly, one of the greatest challenges facing operators of dual-phase fuel supply systems is the likelihood of boil-off. Boil-off, when not controlled and/or prevented, can lead to wasted product, environmental challenges and reduced fuel efficiency. One of the objectives of the present invention is to minimize and, ultimately, eliminate boil-off relevant applications.

SUMMARY OF THE INVENTION

The present invention may be embodied in numerous forms that involve a dual-phase fuel supply with various sensors and valves for managing the liquid-vapor balance as well as the temperature and pressure of the fuel. The various embodiments improve on the related art by optimizing fuel efficiency, cost, environmental impact, etc. Although the embodiments addressed below do not represent an exhaustive list, embodiments of the invention are often adapted to draw liquid propane by gravity-feed from non-powered fuel canisters into an intermediate pressure vessel. Embodiments often include features that monitor the liquid propane within the pressure vessel as a primary indicator for determining the preferred mode for supplying fuel to the associated engine. When operating in normal modes, an adequate volume of liquid phase fuel in the pressure vessel indicates to the engine's ECM to activate a liquid pump in the pressure vessel for pumping the LPG fuel to a liquid rail for supplying the engine's fuel injectors, while other facets of preferred system also involve activating a bypass valve for startup purge, particularly if the liquid fuel injector rail contains vapor phase fuel due to hot-soaking.

Other objects, features and advantages of the present invention will become evident to the reader, and it is intended that these objects, features and advantages are within the scope of the present invention.

To the accomplishment of all the above and related objectives, it should be recognized that this invention may be embodied in the form illustrated in the accompanying drawings, attention being called to the fact, however, that the drawings are illustrative only, and that changes may be made in the specifics illustrated or described.

DETAILED DESCRIPTION OF PREFERRED EMBODIMENTS

The description below is a disclosure of some of the preferred embodiments of the present invention. This description is not intended to be a limiting or exhaustive list of applications and configurations of embodiments of the invention. Rather, this description should serve to enable one of skill in the art to understand at least one preferred approach to practicing the invention. Accordingly, one of skill in the art would recognize that the description discloses only a few of the many embodiments available.

The use of the term "or" in the claims is used to mean "and/or" unless explicitly indicated to refer to alternatives only or the alternatives are mutually exclusive, although the disclosure supports a definition that refers to only alternatives and "and/or."

Throughout this application, the term "about" is used to indicate that a value includes the standard deviation of error for the device and/or method being employed to determine the value.

As used herein in the specification, "a" or "an" may mean one or more unless clearly indicated otherwise. As used herein in the claim(s), when used in conjunction with the word "comprising," the words "a" or "an" may mean one or more than one. As used herein, "another" may mean at least a second or more.

Any embodiment of the system may consist of or consist essentially of—rather than comprise/include/contain/have— the described features and/or steps. Thus, in any of the claims, the term "consisting of" or "consisting essentially of" may be substituted for any of the open-ended linking verbs recited above, in order to change the scope of a given claim from what it would otherwise be using the open-ended linking verb.

Figure 1:
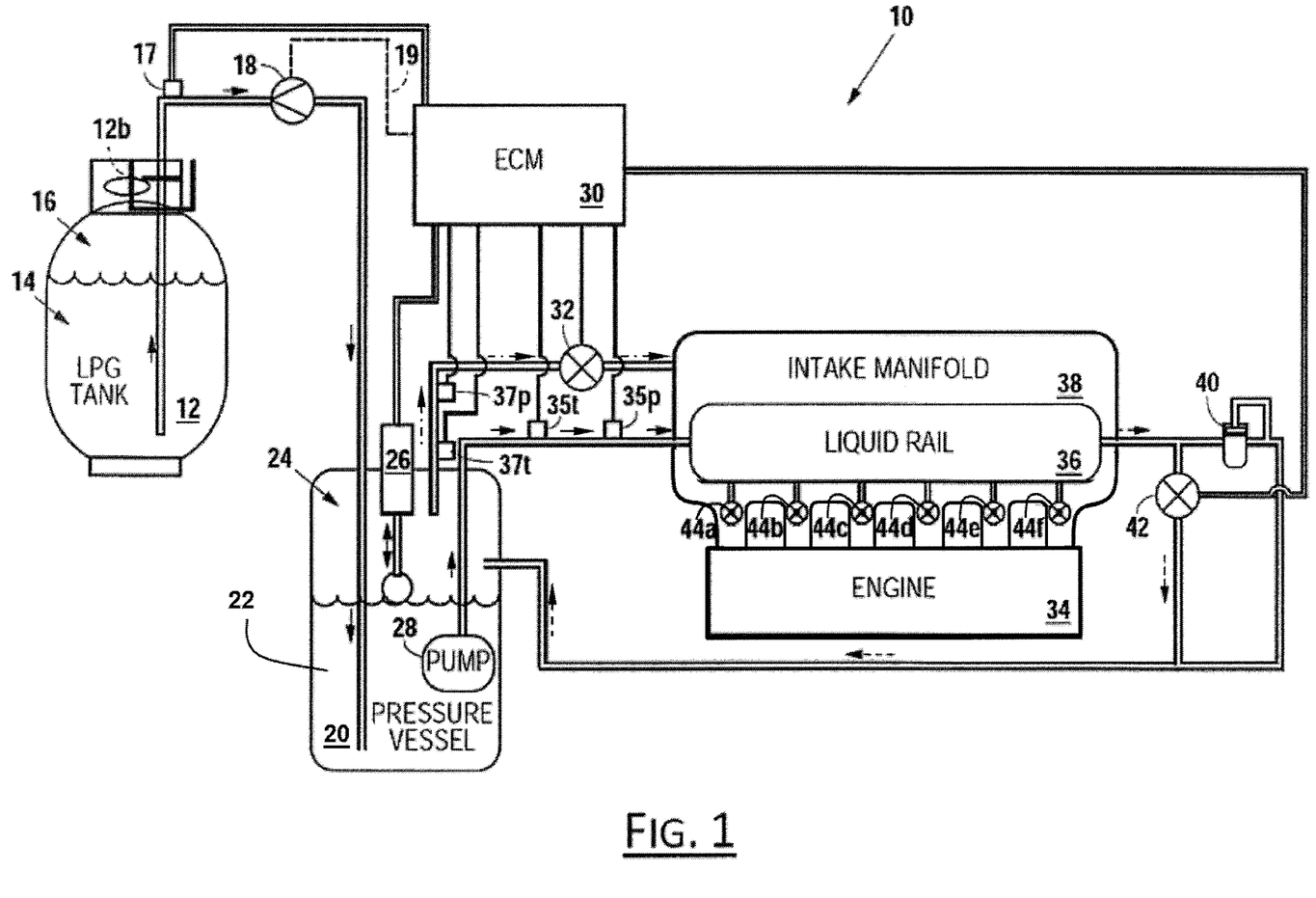
FIG. 1 is a functional block diagram showing the basic components of fuel supply system 10, as well as the liquid and gas flow lines between the components and the signal and control connections within the system 10, which represents a preferred embodiment of the present invention.

Reference is made first to FIG. 1 for an overview of the components in the fuel supply system 10 which represents a preferred embodiment of the present invention, providing for a dual-phase fuel supply with tank management controls. Though not shown in the drawings, this system may be implemented to power forklifts, vehicles, heavy equipment and other machinery. Of course, these suggestions are not intended to be limiting but open ended. FIG. 1 is a functional block diagram showing the primary components associated with a liquefied petroleum gas (LPG) fueled internal combustion engine. Disclosed in FIG. 1 are those components that serve to define the preferred embodiment and its novel operation. In general, the present invention is embodied in relation to fuel supply systems, such as those that include those components associated with the pressure vessel 20 shown in FIG. 1 as well as a number of ancillary control valves [18, 32, 40, 42] and control sensors [26, 17, 35t, 37t, 35p, 37p] used to carry out operation of the system 10. The internal combustion engine 34 and the LPG tank 12 shown in FIG. 1 are typical of such components in the field. Although not illustrated, system 10 may be implemented with a fork lift or other machinery for improved performance of the engine.

The terms "liquefied petroleum gas" (LPG) and "propane" are used interchangeably in the present description, even though the term LPG is used in the field to generically refer to a mixture that is often composed of both propane and butane gases. It is recognized that the content of LPG used as a fuel often varies, sometimes containing more propane or more butane. The form of LPG used in the United States as a motor fuel is typically simply referred to as commercial propane. For this reason, the terms LPG and propane are used interchangeably in the present description, although one skilled in the art will recognize that the references represent LPG of varying compositions.

Fuel delivery system 10 initially is shown to include a replaceable or interchangeable liquefied petroleum gas (LPG) tank 12 containing liquid propane 14 as well as a quantity of gaseous propane 16. Tank 12 is a typical LPG pressurized tank container. LPG tank 12 will typically have a quick-connect coupling and/or quick-disconnect coupling 12b to a fuel line directed to pressure vessel 20 as shown in FIG. 1. Such a coupling, 12b, is located upstream of check valve 18. Use of quick-disconnect couplings provides various benefits including reduced spillage and vapor inclusion, quick and simple operation, and elimination of a need for twisting, turning, or wrenching of parts. They further streamline system inspection and maintenance while preventing the need to vent hydraulic systems to the atmosphere. Such self-sealing features eliminate the need for re-priming and bleeding air from closed systems. As for system repair, quick couplings are useful in isolating components or sub-systems for troubleshooting.

In the typical LPG-powered internal combustion engine arrangement, the fuel tank feeds the fuel into the engine system by gravity, eliminating the need for an active pump within the fuel line from the fuel tank. This requires that LPG tank 12 be physically positioned above pressure vessel 20 in place on the vehicle operating the internal combustion engine. In most embodiments of the present invention, check valve 18 is positioned within the fluid flow line shown between LPG tank 12 and pressure vessel 20. Check valve 18 helps ensure that propane from pressure vessel 20 does not return to LPG tank 12. Operating in conjunction with ECM 30 is pressure sensor 17. Pressure sensor 17 assists with determining when the pressure of vessel 20 surpasses the pressure of LPG tank 12. In an alternative embodiment, check valve 18 could be an ECM-controlled solenoid valve with tank pressure in line to the tank, as shown by dashed line 19 in FIG. 1.

The flow diagram of FIG. 1 shows fuel flow lines between the various components with solid arrows representing the flow of liquid propane 14, 22, and dot-dash-lined arrows representing the flow of gaseous propane 24. A mixture of liquid and gas propane in a number of the return lines is represented by the dashed-line arrows. Those skilled in the art will recognize that these flow line connections relating to preferred embodiments of the present invention should be constructed of materials and components typical in the field for use in conjunction with internal combustion engines that operate on LPG fuel at the temperatures and pressures typical of such systems.

The gravity-fed liquid propane 14 from LPG tank 12 flows into pressure vessel 20 where a quantity of liquid is retained as liquid propane 22. A volume of space within pressure vessel 20 comprises gaseous propane 24, defining a liquid level interface between liquid propane 22 and gaseous propane 24 that is measured and monitored by liquid or float level sensor 26. Also contained within pressure vessel 20 is liquid fuel pump 28, immersed within liquid propane 22 and directing the liquid propane to an outlet from pressure vessel 20. Conducting gaseous propane 24 is a further outlet from pressure vessel 20 at a point separate from the volume of the liquid within the vessel 20.

Pressure vessel 20 is a necessary intermediate component between engine 34 and LPG tank 12 primarily for the process of supplying two-phase fuel to the engine 34. The structures and functions of pressure vessel 20 are operated by the engine control module (ECM) 30 and provide for the delivery of both liquid propane 22 and gaseous propane 24 to internal combustion engine 34. Liquid propane 22 is delivered by pump 28 into liquid rail 36 associated with engine 34 that incorporates and connects to standard liquid propane fuel injectors 44a, 44b, 44c, 44d, 44e, 44f. Gaseous propane 24 is provided from pressure vessel 20 to intake manifold (also referred to as the "vapor rail") 38 which serves to combine the gaseous propane 24 into the liquid propane fuel-injected stream for combustion within the cylinders of engine 34.

As liquid propane 22 flows from vessel 20 to liquid rail 36, the pressure and temperature of the liquid propane 22 are measured via pressure sensor 35p and temperature sensor 35t, respectively. The sensors 35p and 35t are electronically connected to ECM 30 for control of system 10.

As gaseous propane 24 flows from vessel 20 to intake manifold 38, the pressure and temperature of the gaseous propane 24 are measured via pressure sensor 37p and temperature sensor 37t, respectively. The sensors 37p and 37t are electronically connected to ECM 30 for control of system 10. Sensors 37p and 37t are located downstream of pressure vessel 20 and upstream of gas valve 32. In an alternative embodiment, instead of sensors 37p and 37t, the temperature and pressure could be inferred from the intake manifold temperature and pressure.

The flow of liquid propane 22 into liquid rail 36 comprises part of a circulatory system that utilizes a quantity of the liquid propane 22 through the fuel injectors 44a, 44b, 44c, 44d, 44e, 44f, but re-circulates the unused liquid back to pressure vessel 20 in a manner described in more detail below. Gaseous propane 24, on the other hand, is directed out of pressure vessel 20, and into intake manifold 38, by way of gas valve 32 under the control of ECM 30. ECM 30 monitors the liquid level within pressure vessel 20 using float level sensor 26 and opens and closes gas valve 32 to regulate the flow of gaseous propane. It is this manner of optimizing the flow of gaseous propane 24 as needed from pressure vessel 20 that optimizes the efficiency of the engine 34 and the burning of the fuel therein. Conditions under which ECM 30 operates to open and close gas valve 32 are described in more detail below.

As indicated above, liquid rail 36 directs liquid propane 22 to the fuel injectors 44a-44f, thereby providing the fuel to the six cylinders, which are not shown, for combustion within the engine 34. The circulatory flow of liquid propane 22 from liquid rail 36 back to pressure vessel 20 is controlled by way of two valves [40, 42] configured within the system. Diaphragm valve 40 preferably has a maximum allowable pressure of a predetermined amount, such as 70 psi, which is determined based on desired operation of the fuel injectors 44. That maximum allowable pressure for liquid rail 36 can be exceeded by the normal operation of pump 28 so long as rail 36 is filled with liquid phase fuel, such that valve 40 normally allows return of liquid fuel flow back to pressure vessel 20 once the predetermined pressure is met. However, when the liquid rail 36 is hot-soaked, the liquid fuel in rail 36 can vaporize. When vapors accumulate rail 36, they can frustrate normal operation of diaphragm valve 40. Hence, if ECM 30 detects temperature or pressure conditions that suggest vapor in rail 36 due to boil-off in liquid rail 36, the purge valve 42 is engaged by ECM 30 to pull fuel vapors out of the liquid rail 36 and into back into pressure vessel 20. Once the hot fuel vapors are purged back to pressure vessel 20, the added heat can be managed through operation of vent valve 32, such that vapors from hot-soaked boil-off in the liquid rail 36 are recycled for the engine to burn.

Purge valve 42 also provides a controlled bypass that is important for start-up conditions wherein a vapor purge of the circulation system can be achieved for an initial 100-200 ms when operation of the engine is initiated. During normal operating conditions, the temperature in liquid rail 36 increases. As a result, the temperature of liquid propane 22 within liquid rail 36 will also increase. When engine 34 is shut off but not allowed to completely cool, vapor tends to accumulate in the liquid rail 36 due to the high temperature in liquid rail 36, otherwise known as a hot soaked rail condition. This accumulated vapor will be vented from liquid rail 36 by purge valve 42 at the next start-up. After that start-up purge, the circulation of liquid propane 22 through the system proceeds as normal. Control of purge valve 42 is made by ECM 30.

As indicated above, the initiated feed of fuel from the LPG tank 12 is accomplished by gravity although the tank 12 itself is generally pressurized at or about 150-200 psi. This pressure is typical for ambient temperatures around 75 degrees F. As the LPG tank 12 is generally isolated from engine 34, tank 12 typically maintains a temperature close to ambient temperature, and therefore, its pressure will be maintained at or about 150-200 psi.

Pressure vessel 20, on the other hand, is in closer proximity to the engine 34 and will tend to increase in temperature during operation of the engine 34. This increase in temperature may drive pressure within the pressure vessel 20 up to as much as 250 psi. The liquid propane 22, however, will generally flow to the liquid rail 36 at about 200 psi, given that during ordinary operation, the pressure in pressure vessel 20 is between 50 psi and 150 psi. All the while, pump 28 provides a step-up of 60-75 psi. This is more pressure than is needed for operation of the injectors 44a-44f, thereby establishing the need for a return line for circulation of the liquid fuel 22. Control over the conditions in the pressure vessel 20 is accomplished by monitoring the liquid level therein, which as temperature increases, liquid propane 22 tends to boil off, resulting in the lowering of the liquid level within the vessel 20. The ECM 30, therefore, monitors the float sensor 26 and uses the liquid level as a reference for controlling the gas valve 32 for regulating the flow of propane gas 24 from pressure vessel 20 into the intake manifold 38 as described above.

Pressure in intake manifold 38 may be between minus 10 to about 20 psig. This pressure is considerably lower than the vapor pressure normally within pressure vessel 20. During intervention in a boil-off event, gas valve 32 opens, as controlled by ECM 30. With gas valve 32 open, gaseous propane 24 will naturally flow from pressure vessel 20 to intake manifold 38 in accordance with this pressure gradient.

With the structure of the system 10 therefore defined, the operation of the system 10 may be carried out so as to optimize the combination of the two-phase fuel supplied to the engine 34 and the circulation of excess fuel back into the pressure vessel 20 component. In addition, start-up conditions may be easily addressed utilizing the pump 28 within the pressure vessel 20 directing the flow of fluid fuel 22 into the system 10, as well as control over the bypass valves [40, 42] as described above. Vapor lock conditions that frequently occur when the temperature of the LPG tank 12 is significantly less than the temperature of the pressure vessel 20, can also be addressed utilizing control systems according to the teachings of the present invention as described.

In an alternative embodiment, check valve 18 is monitored by ECM 30. In such an alternative embodiment, check valve 18 is a controlled solenoid valve with tank pressure in line from tank 12.

Figure 2:
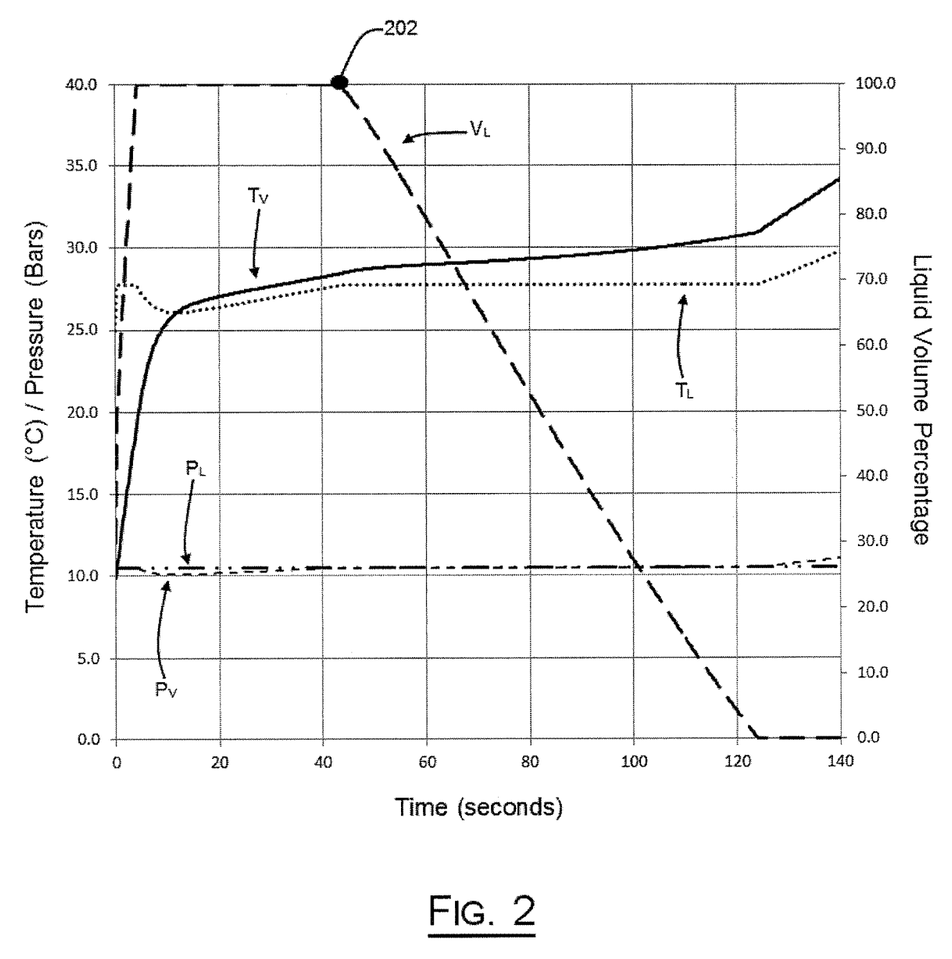
FIG. 2 is a graph showing relative variations of temperature, pressure, and volume within a pressure vessel during the operation of the system of the present invention undergoing boil-off.

FIG. 2 shows the changes in liquid volume ($V_L$), vessel temperature ($T_V$), vapor pressure ($P_V$), liquid temperature ($T_L$), and liquid pressure ($P_L$) over time for a pressure vessel undergoing problematic boil-off. That is, when temperature of the liquid is greater than the boiling point of the liquid, the liquid begins to boil in the vessel. The horizontal axis represents time in seconds. The left vertical-axis (scale: 0.0-40.0) reflects temperature and pressure as measured in degrees Celsius and bars, respectively. The right vertical-axis, (scale: 0.0-100.0), however, reflects the percentage of actual liquid height as compared to the pre-determined optimal liquid height within the tank. Note that the target liquid volume height of the liquid LPG fuel 22 in the pressure vessel 20 is within a predetermined range based largely on design preferences. For instance, the target liquid volume height of the liquid LPG fuel 22 in the pressure vessel 20 in the preferred embodiment is controlled to be within a predetermined range of 50-80% of the overall volume of pressure vessel 20, although it could just as readily be controlled to be within a predetermined range of 50-75% of the overall volume of pressure vessel 20. With pump 28 located within pressure vessel 20 as is preferred, the lower end of that predetermined range must at least be large enough to ensure that the intake port for pump 28 remains submerged in the liquid fuel 22. One of the objectives of the present invention is to reduce and even eliminate boil-off in such a dual-phase fuel system.

As observed, the liquid volume quickly rises after initiating engine start and then remains constant temporarily until it decreases at a linear rate. This relationship follows intuition. When the engine starts, liquid propane 14 is drawn from the tank 12 and increases in volume in the pressure vessel 20 until its level is controlled by the float level sensor 26. The float level sensor 26, along with the ECM 30, assists by regulating the level of liquid propane 22 in the pressure vessel 20. The linear decrease in the volume of liquid is attributed to a boil-off scenario. The volume reaches zero when all of the liquid propane 22 is boiled off.

As for temperature, it appears that temperature of the liquid propane 22 in the vessel 20 decreases slightly at the beginning of the process, returns to close to its initial temperature and ultimately rises slightly near the end of the process. Temperature of the vessel 20, on the other hand, increases rapidly at the beginning of the process, continues to rise gradually for most of the process, and quickly rises near the end of the process. These changes in temperature follow intuition as well, when considering the boil-off scenario. The initial rise in temperature of the vessel 20 is attributed to the minimal presence of liquid propane 22 initially and the vessel's proximity to the engine. Early in the process, the vessel 20 is more highly susceptible to fluctuation in temperature. When the process commences, the elevated engine temperature drastically affects the temperature of the vessel 20. As the process continues and liquid volume tapers, so too does the temperature (more or less). As boil-off occurs, the temperature of the vessel 20 continues to increase but not as much as was observed at the beginning of the process. The temperature of the vessel increases at a greater rate once the liquid has completely boiled off. Temperature of the liquid propane 22 in the vessel 20, on the other hand, decreases early in the process. The initial increase in liquid volume coincides with a liquid draw from tank 12 to pressure vessel 20. Given that tank 12 is some distance from engine 34, the temperature of tank 12, and correspondingly the liquid propane 14 flowing from tank 12 would be cooler than liquid propane 22 in vessel 20. The addition of a quantity of cooler liquid into vessel 20 would result in an expected drop in temperature of liquid propane 22, such drop being indicated on FIG. 2. The temperature of the liquid propane 22 increases because the temperature of the vessel 20 increases with the process. As the liquid volume in the vessel begins to deplete, the temperature of the liquid propane 22 remains constant because the liquid is boiling off (phase change).

Regarding pressures, both values remain relatively constant throughout the process. There is no surprise that the liquid pressure would remain constant. Seeing that there is no mechanical contractive or expansive force on the liquid propane 22 in the vessel 20 and the pressure of the vapor is not at an extreme level, there is no reason for the pressure of the liquid in the vessel 20 to fluctuate more than marginally. As for the vapor pressure, its value too, remains relatively constant. For similar reasons to the liquid pressure, the vapor pressure remains relatively constant. Note, however, that there is a slight dip in the vapor pressure that is almost contemporaneous with the plateau in liquid volume in the vessel. This occurrence is likely attributed to the possible adjustment in the process control associated with the float level sensor 26. Similarly, there is a slight rise in vapor pressure near the end of the process likely due to the boiling off of all liquid in vessel 20.

The boil-off dilemma, as depicted in FIG. 2, is reduced or eliminated when the gaseous vapor 24 is vented from pressure vessel 20 to the intake manifold 38 in order to monitor the rate of change in liquid level over time and reduce any drop in liquid level below threshold (target between 50-75%). It follows that temperature and pressure of vapor reduces while volume rises or remains constant once above the threshold. When the boil-off commences, indicated by point 202 in FIG. 2, the volume of liquid begins to decrease. A watching period occurs so that the volume of liquid does not fall below the target liquid volume. In order to maintain this target liquid volume, an intervention is necessary whereby vapor is vented from the pressure vessel 20 to intake manifold 38. As this vapor is vented, the pressure within vessel 20 drops such that the pressure in vessel 20 is now lower than the pressure in tank 12. Based on this pressure difference, there would be a flow of liquid propane 14 from tank 12. As a result of the intervention, the addition of a volume of cooler liquid from tank 12 to the liquid propane 22 in pressure vessel 20 will lower the temperature of the liquid propane 22 which in turn will reduce or eliminate the boil-off.

More specifically, and by default, the normal mode of operation of system 10 operates with gas valve 32 closed. It is when volume in the vessel 20, as measured by float level sensor 26, falls below a desired level (typically a lower threshold of about 50%) that gas valve 32 is opened. When gas valve 32 opens, it effectively intervenes or regulates the liquid level by venting gaseous propane 24 from pressure vessel 20 a pulse width control. This venting of gaseous propane 24 results in a decrease in vapor pressure within pressure vessel 20. The drop in vapor pressure within pressure vessel 20 results in a pressure differential wherein the pressure in vessel 20 is now lower than the pressure in tank 12. Because of this pressure differential, there will be a draw of liquid propane 14 from tank 12 to pressure vessel 20. Since liquid propane 14 flowing from tank 12 is lower in temperature than liquid propane 22 in pressure vessel 20, the addition of the cooler liquid will cause the temperature of liquid propane 22 in pressure vessel 20 to drop. It is this resultant cooling of liquid propane 22 in pressure vessel 20 which minimizes or stops the boil-off event. Gas valve 32 will continue to vent gaseous propane from pressure vessel 20 into intake manifold 38 and liquid propane 14 will continue to flow from tank 12 into vessel 20 until the upper liquid level threshold (about 75%) is reached. This vented gas will be mixed with liquid propane 22 in liquid rail 36 for combustion in engine 34. Once the liquid level has reached the upper threshold, gas valve 32 will close under the control of ECM 30. Closing gas valve 32 will stop the venting of gaseous propane from pressure vessel 20' to intake manifold 38.

The normal mode of operation of the fuel supply system 10 is characterized by a normally closed gas valve 32, wherein the mass flowrate of the fuel being injected to the engine is managed as typical for SIDI engines. Then, if the ECM 30 detects that hot fuel vapors need to be vented from the pressure vessel 20, such as if the liquid level sensor 26 detects that the liquid in pressure vessel 20 has dropped more than a predetermined threshold, ECM 30 modifies the control strategy to a two-phase fuel supply mode that allows for venting such hot fuel vapors into intake manifold 38.

In the two-phase fuel supply mode of operation of the fuel supply system 10 is characterized by intermittent flow of hot fuel vapors through valve 32. Alternating between an open and closed vapor valve 32 the ECM 30 adjusts the operation of fuel injectors 44 in order to account for the increase fuel being supplied in vapor form, managing the combined flows of both liquid and vapor fuel supplies to still attain the instantaneous mass flowrate of fuel required to meet the engine's current operating requirements. Note that the mass flow of fuel in each combustion chamber is equal to the mass flow of injected liquid fuel plus the mass flow of vapor phase of the fuel, as determined by ECM 30 based on data from the various sensors of fuel supply 10. Also, closed gas valve 32 reflects the system in default because liquid flow is preferred. Because, although two-phase fuel supply is accommodated, it is preferred that the flow of fuel to the engine is predominantly liquid phase. This preference, and the resulting system bias, relates to the practicality that liquid-phase fuel tends to cool intake air and, accordingly, tends to reduce knock. In an alternative embodiment, the rate of change in the volume, as opposed to the drop in liquid volume level, would trigger an intervention/regulation by venting to intake manifold 38 as described above.

In an alternative embodiment, a proportional mode of operation is employed wherein gas valve 32 operates as a proportional valve. More particularly, in a proportional operating mode as an alternative to the normal mode described above, gas valve 32 would always be slightly open, constantly venting some vapor from pressure vessel 20 to intake manifold 38. When the level of liquid propane 22 drops below the lower threshold in pressure vessel 20 indicative of a boil-off event, as measured by liquid level sensor 26, ECM 30 would intervene to stop the boil-off by engaging gas valve 32 to a fully open position as described above. Liquid propane 14 is directed from LPG tank 12 to pressure vessel 20 until the upper liquid level threshold is reached, at which point gas valve 32 would return to its previous slightly open position, allowing only some vapor through as described. This proportional operating mode will result in a true dual-phase fuel supply as gas valve 32 would normally be at least slightly open at all times, thereby supplying some gaseous propane 24 for combustion in engine 34 along with liquid propane 22 supplied to liquid rail 36 from pressure vessel 20.

Figure 3:
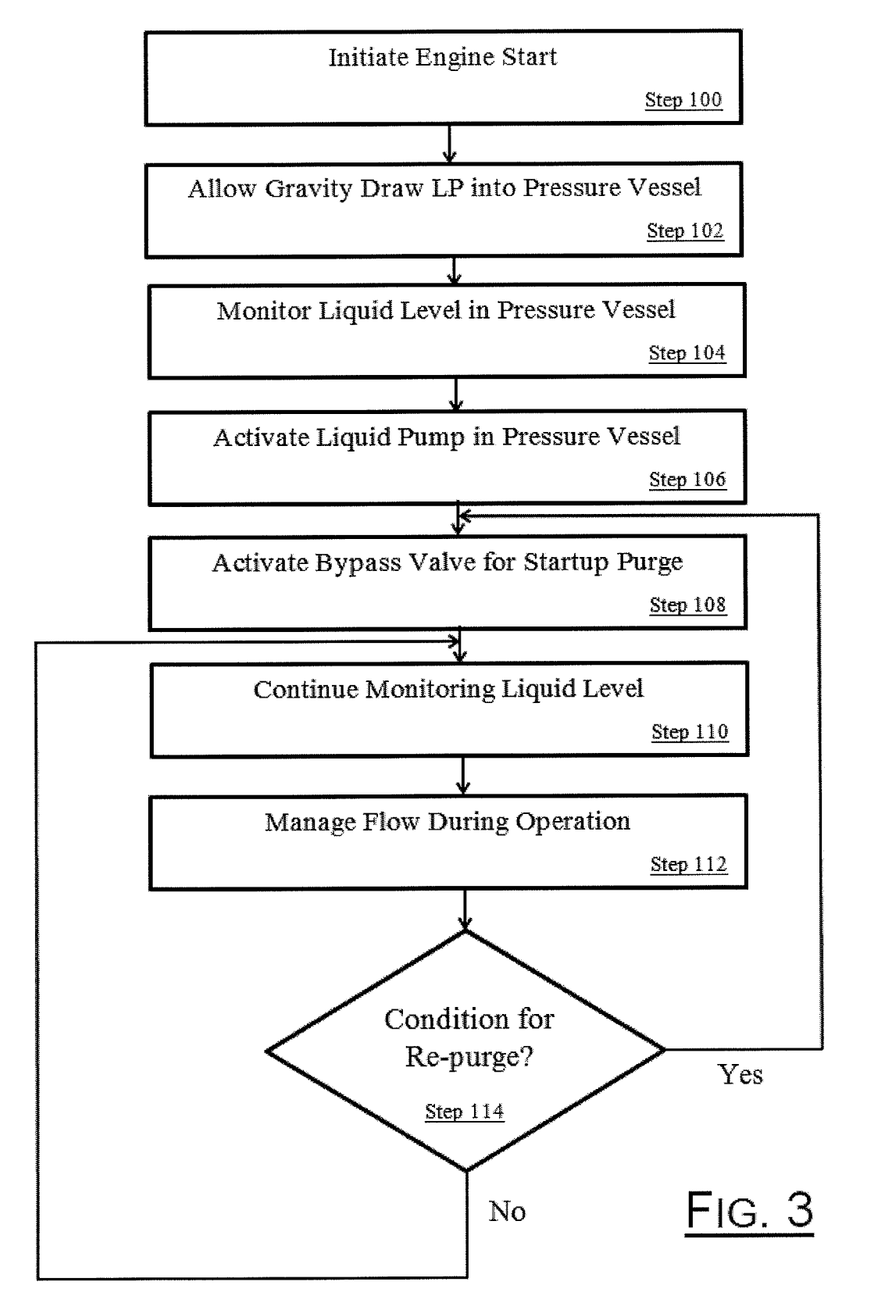
FIG. 3 is a flow chart showing the primary steps in the operational monitoring and control of the system 10 of FIG. 1, as programmed into the engine control module (ECM) 30.

As for FIG. 3, we note the primary steps in the preferred operational monitoring and control of the system 10 as preferably programmed into the ECM 30. In following these primary steps, the process begins with the initiation of engine start, Step 100. After the engine start has been initiated, the liquid propane 14 stored in the tank 12 is allowed to draw into the pressure vessel 20 via gravity, Step 102. By float level sensor 26, the liquid level in the vessel 20 is monitored, Step 104. Once sufficient liquid propane 22 exists in the vessel 20, the liquid pump 28 in the pressure vessel 20 is activated and liquid propane 22 moves in accordance with schematic and details of FIG. 1, Step 106. Purge valve 42 provides controlled bypass that is important for start-up conditions wherein a vapor purge of the circulation system can be achieved for an initial 100-200 ms when operation of the engine 34 is initiated, thus the startup purge, Step 108. As fuel proceeds through bypass, Step 108, the system continues to monitor the liquid level in the pressure vessel 20, Step 110. Accordingly, the system 10 manages the flow by controlling various valves, step 112. Following Step 112, the system 10 returns to the transition between Step 108 and Step 110.

Also shown in FIG. 3, a re-purge of vapor may be necessary subsequent to the start-up purge shown in Step 108. Certain conditions can prompt a re-opening of the purge loop during extended operations as would be understood by a person having ordinary skill in the art.

It should be understood, though, that the sequence and detail of FIG. 3 are merely exemplary, generalized steps of a preferred process. To the extent still within the scope of the invention as defined in any particular claim, each of those Steps 100-112 can be subdivided, combined, transposed, intertwined, eliminated or replaced with equivalents or alternates, as would be known or evident from this description to one of ordinary skill in the art, especially pursuant other teachings known or commercially implemented in the pertinent fields.

Note that the foregoing disclosure emphasizes certain specific embodiments of the invention and that all modifications or alternatives equivalent thereto are within the spirit and scope of the invention as set forth in the appended claims. All references cited herein are incorporated by reference in their entirety for all purposes.

Although the present invention has been described in conjunction with particular preferred structures, and in conjunction with generalized, preferred methods of operation for these structures, those skilled in the art will recognize many other modifications to the structures and methodology that still fall within the scope of the invention. The specific device associated with components like the pump 28 and the bypass valves [40, 42] may, for example, be implemented in any number of different ways using a variety of different brand or modified components.

Likewise, the fluid conduits associated with the transport of liquid and vapor in preferred embodiments may also be structured and made of any number of different manners, including rigid pipe, or flexible connecting hose, etc.

It is also recognized that the systems and methods of the present invention might be implemented in a variety of products or applications, or as a retrofit device adaptable to any number of engine powered systems. Note that in some retrofit environments, intermediate components may be necessary to adequately implement the system.

Numerous other features, objects, advantages, alternatives, variations, equivalents, substitutions, combinations, simplifications, elaborations, distributions, enhancements, improvements or eliminations (collectively, "variations") will be evident from these descriptions to those skilled in the art, especially when considered in light of a more exhaustive understanding of the numerous difficulties and challenges faced by the art, all of which should be considered within the scope of the invention, at least to the extent substantially embraced by the invention as defined in the claims (including any added claims and any amendments made to those claims in the course of prosecuting this and related applications).

In all respects, it should also be understood that the drawings and detailed description herein are to be regarded in an illustrative rather than a restrictive manner, and are not intended to limit the invention to the particular forms and examples disclosed. Rather, the invention includes all variations generally within the scope and spirit of the invention as claimed. Any current, amended, or added claims should be interpreted to embrace all further modifications, changes, rearrangements, substitutions, alternatives, design choices, and embodiments that may be evident to those of skill in the art, whether now known or later discovered. In any case, all substantially equivalent systems, articles, and methods should be considered within the scope of the invention and, absent express indication otherwise, all structural or functional equivalents are anticipated to remain within the spirit and scope of the present inventive system and method.

The invention claimed is:

1. A fuel supply system for supplying a liquefied petroleum gas (LPG) fuel to an internal combustion engine, wherein said fuel supply system is adapted to manage both liquid and gaseous phases of the LPG fuel, said fuel supply system comprising:
   a) a fuel line having fittings for connecting said fuel line to a replaceable LPG fuel canister, said fuel line being adapted to serve as a conduit for LPG fuel supplied by said replaceable LPG fuel canister;
   b) a pressure vessel for containing both liquid and gaseous phases of said LPG fuel, said pressure vessel being connected in fluid communication with said fuel line for receiving said LPG fuel from said fuel line;
   c) a liquid fuel rail for conveying said LPG fuel to fuel injectors for injecting said LPG fuel into an internal combustion engine such that said LPG fuel may be operatively combusted by said internal combustion engine;
   d) a liquid pump associated with said pressure vessel for pumping said liquid phase of said LPG fuel from said pressure vessel to said liquid fuel rail;
   e) a liquid level sensor such as a float sensor for monitoring a characteristic indicative of the volume of said liquid phase of said LPG fuel in said pressure vessel;
   f) a plurality of valves for regulating flow of said LPG fuel, said plurality of valves including a gas valve in fluid communication with said pressure vessel and an intake manifold of said internal combustion engine, said gas valve being a normally-closed valve;
   g) one or more controllers adapted for controlling operative functions of said pump and said plurality of valves;
   h) said one or more controllers being further adapted to receive feedback signals from said liquid level sensor and one or more other sensors relating to sensed conditions within said system, wherein said one or more other sensors comprises two temperature sensors for monitoring the temperature of said liquid and gaseous phases of the LPG fuel within said system;
   i) said one or more controllers being further adapted to determine whether a boil-off event is occurring in said pressure vessel based on a feedback signal from said liquid level sensor; and
   j) said one or more controllers being further adapted to intervene to stop said boil-off event, said one or more controllers being further adapted to open said gas valve, in response to said feedback signal indicating the boil-off event, such that a quantity of said gaseous phase of said LPG fuel is directed out of said pressure vessel and into said intake manifold of said internal combustion engine, and wherein said quantity of said gaseous phase of said LPG fuel is mixed with said liquid phase of said LPG fuel in said liquid fuel rail for continuous simultaneous combustion in said internal combustion engine until an upper liquid level threshold in said pressure vessel is reached as measured by said liquid level sensor.

2. The fuel supply system of claim 1, wherein said LPG fuel canister comprises an interchangeable pressurized container, said LPG fuel canister being positioned for delivering LPG fuel to said pressure vessel by action of gravity.

3. The fuel supply system of claim 1, wherein said one or more sensors further comprise one or more pressure sensors for monitoring the pressure of said liquid and gaseous phases of said LPG fuel within said system.

4. The fuel supply system of claim 1, wherein said pump is immersed in said liquid LPG fuel within said pressure vessel.

5. The fuel supply system of claim 1, wherein said plurality of valves further comprises a one-way check valve in fluid communication with said LPG fuel canister and said pressure vessel for regulating a unidirectional flow of LPG fuel from said LPG fuel canister to said pressure vessel.

6. The fuel supply system of claim 1, wherein said plurality of valves further comprises a diaphragm valve and a purge valve both being in fluid communication with said liquid fuel rail and said pressure vessel, wherein said diaphragm valve is configured to allow the return of liquid phase LPG fuel back to said pressure vessel, and wherein said purge valve is configured to pull gaseous phase LPG fuel out of said liquid fuel rail and return said gaseous phase LPG fuel to said pressure vessel.

7. A fuel supply system for supplying a liquefied petroleum gas (LPG) fuel to an internal combustion engine, wherein said fuel supply system is adapted to manage both liquid and gaseous phases of the LPG fuel, said fuel supply system comprising;
 a) a pressurized liquefied petroleum gas (LPG) fuel canister for containing a quantity of liquid and gaseous phases of said LPG fuel, said LPG fuel canister being interchangeable;
 b) a pressure vessel in fluid communication with said LPG fuel canister;
 c) said LPG fuel canister being positioned for delivering LPG fuel to said pressure vessel by action of gravity;
 d) one or more sensors for monitoring one or more conditions within said system, said one or more sensors comprising:
  1) two temperature sensors for monitoring the temperature of said liquid and gaseous phases of said LPG fuel within said system;
  2) one or more pressure sensors for monitoring the pressure of said liquid and gaseous phases within said system; and
  3) a liquid level sensor for monitoring the volume of liquid LPG fuel within said pressure vessel;
 e) a plurality of valves for regulating flow of liquid and gaseous phases within said system, said plurality of valves comprising:
  1) a gas valve in fluid communication with said pressure vessel and an intake manifold for regulating flow of said gaseous phase between said pressure vessel and an intake manifold, wherein said intake manifold is configured to combine gaseous LPG fuel into a liquid LPG fuel-injected stream;
  2) a one-way check valve in fluid communication with said LPG fuel canister and said pressure vessel for regulating a unidirectional flow of LPG fuel from said LPG fuel canister to said pressure vessel; and
  3) a diaphragm valve and a purge valve both being in fluid communication with a liquid fuel rail and said pressure vessel, wherein said diaphragm valve is configured to allow the return of liquid phase LPG fuel back to said pressure vessel, and wherein said purge valve is configured to pull gaseous phase LPG fuel out of said liquid fuel rail and return said gaseous phase LPG fuel to said pressure vessel;
 f) a pump within said pressure vessel for directing liquid LPG fuel to an outlet of said pressure vessel, wherein said pump is immersed in the liquid LPG fuel within said pressure vessel;
 g) one or more controllers adapted for controlling operative functions of said pump and said plurality of valves;
 h) said one or more controller being further adapted to receive feedback signals from said one or more sensors relating to sensed conditions within said system;
 i) said one or more controllers being further adapted to determine whether a boil-off event is occurring said pressure vessel based on a feedback signal from said liquid level sensor; and
 j) said one or more controller being further adapted to intervene to stop said boil-off event, said one or more controllers being further adapted to open said gas valve, in response to said feedback signal indicating the boil-off event, such that a quantity of said gaseous phase of said LPG fuel is directed out of said pressure vessel and into said intake manifold of said internal combustion engine, and wherein said quantity of said gaseous phase of said LPG fuel is combined with said liquid phase of said LPG fuel for continuous simultaneous combustion in said internal combustion engine until an upper liquid level threshold in said pressure vessel is reached as measured by said liquid level sensor.

\* \* \* \* \*